(12) United States Patent
Gan et al.

(10) Patent No.: US 11,485,331 B2
(45) Date of Patent: Nov. 1, 2022

(54) SURFACE ADAPTATION METHOD AND SURFACE ADAPTATION DEVICE THEREOF

(71) Applicant: National Chung-Shan Institute of Science and Technology, Taoyuan (TW)

(72) Inventors: Ming-Kai Gan, Tainan (TW); Bo-Chiuan Chen, Taipei (TW); Shih-Che Chien, Hsinchu (TW); Chien-Hao Hsiao, Hsinchu (TW); Yu-Sung Hsiao, Taoyuan (TW); Feng-Chia Chang, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 254 days.

(21) Appl. No.: 16/600,555

(22) Filed: Oct. 13, 2019

(65) Prior Publication Data

US 2021/0107440 A1 Apr. 15, 2021

(51) Int. Cl.
  *B60T 8/171* (2006.01)
  *B60T 8/58* (2006.01)
  *B60T 8/86* (2006.01)
  *B60T 8/1755* (2006.01)

(52) U.S. Cl.
  CPC .......... *B60T 8/171* (2013.01); *B60T 8/17551* (2013.01); *B60T 8/58* (2013.01); *B60T 8/86* (2013.01)

(58) Field of Classification Search
  CPC ........ B60T 8/171; B60T 8/17551; B60T 8/58; B60T 8/86; B60T 8/489; B60T 8/1755; B60W 40/064; B60W 40/12; B60W 2552/40
  See application file for complete search history.

(56) References Cited

U.S. PATENT DOCUMENTS

| 5,305,218 | A * | 4/1994 | Ghoneim | B60T 8/172 701/72 |
| 2004/0068358 | A1* | 4/2004 | Walenty | B60T 8/17616 701/71 |
| 2008/0027601 | A1* | 1/2008 | Sewaki | G01C 19/42 701/31.4 |
| 2012/0179327 | A1* | 7/2012 | Yngve | B60W 40/064 701/32.9 |

* cited by examiner

*Primary Examiner* — Faris S Almatrahi
*Assistant Examiner* — Andrew J Cromer
(74) *Attorney, Agent, or Firm* — Winston Hsu (57) ABSTRACT

A surface adaptation method suitable for a vehicle includes evaluating a plurality of longitudinal forces with respect to a plurality of sampling points, evaluating a plurality of wheel slips with respect to the plurality of sampling points, determining a maximum longitudinal force from the plurality of longitudinal forces, and determining a wheel slip threshold from the plurality of wheel slips. The wheel slip threshold corresponds to the maximum longitudinal force.

14 Claims, 8 Drawing Sheets

FIG. 6

SURFACE ADAPTATION METHOD AND SURFACE ADAPTATION DEVICE THEREOF

BACKGROUND OF THE INVENTION

1. Field of the Invention

The present invention relates to a surface adaptation device and a surface adaptation method, and more particularly, to a surface adaptation device and a surface adaptation method suitable for, but not limited to, a vehicle to increase efficiency for anti-lock braking and to reduce costs without compromising quality.

2. Description of the Prior Art

Vehicle safety has received increased attention. An anti-lock braking system (ABS) module provides a safety braking approach to prevent vehicle wheel (s) from locking up, and thus avoids uncontrolled skidding. In the ABS module, a hydraulic control unit is added between a master cylinder and a secondary cylinder in a braking circuit. Hydraulic pressure in the braking circuit is controlled according to wheel slip (s) between a road surface and the wheel to prevent the vehicle wheel (s) from locking up during braking. It is necessary to monitor parameters such as road surface friction coefficient all the time in the ABS module. However, estimating road surface friction coefficient requires information of the current normal force, which is difficult to measure or evaluate. Moreover, the ABS module is normally equipped with a great deal of sensors, and some of the sensors are costly. Therefore, efficiency for anti-lock braking and cost reduction have become significant challenges that need to be addressed.

SUMMARY OF THE INVENTION

Therefore, the present application primarily provides a surface adaptation device and a surface adaptation method suitable for, but not limited to, a vehicle to increase efficiency for anti-lock braking and to reduce costs without compromising quality.

A surface adaptation method suitable for a vehicle includes evaluating a plurality of longitudinal forces with respect to a plurality of sampling points, evaluating a plurality of wheel slips with respect to the plurality of sampling points, determining a maximum longitudinal force from the plurality of longitudinal forces, and determining a wheel slip threshold from the plurality of wheel slips. The wheel slip threshold corresponds to the maximum longitudinal force.

A surface adaptation device configured for a vehicle includes a storage device and a processing circuit, which is coupled to the storage device and configured to execute instructions stored in the storage device. The storage device is configured for storing instructions of evaluating a plurality of longitudinal forces with respect to a plurality of sampling points, evaluating a plurality of wheel slips with respect to the plurality of sampling points, determining a maximum longitudinal force from the plurality of longitudinal forces, and determining a wheel slip threshold from the plurality of wheel slips. The wheel slip threshold corresponds to the maximum longitudinal force.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
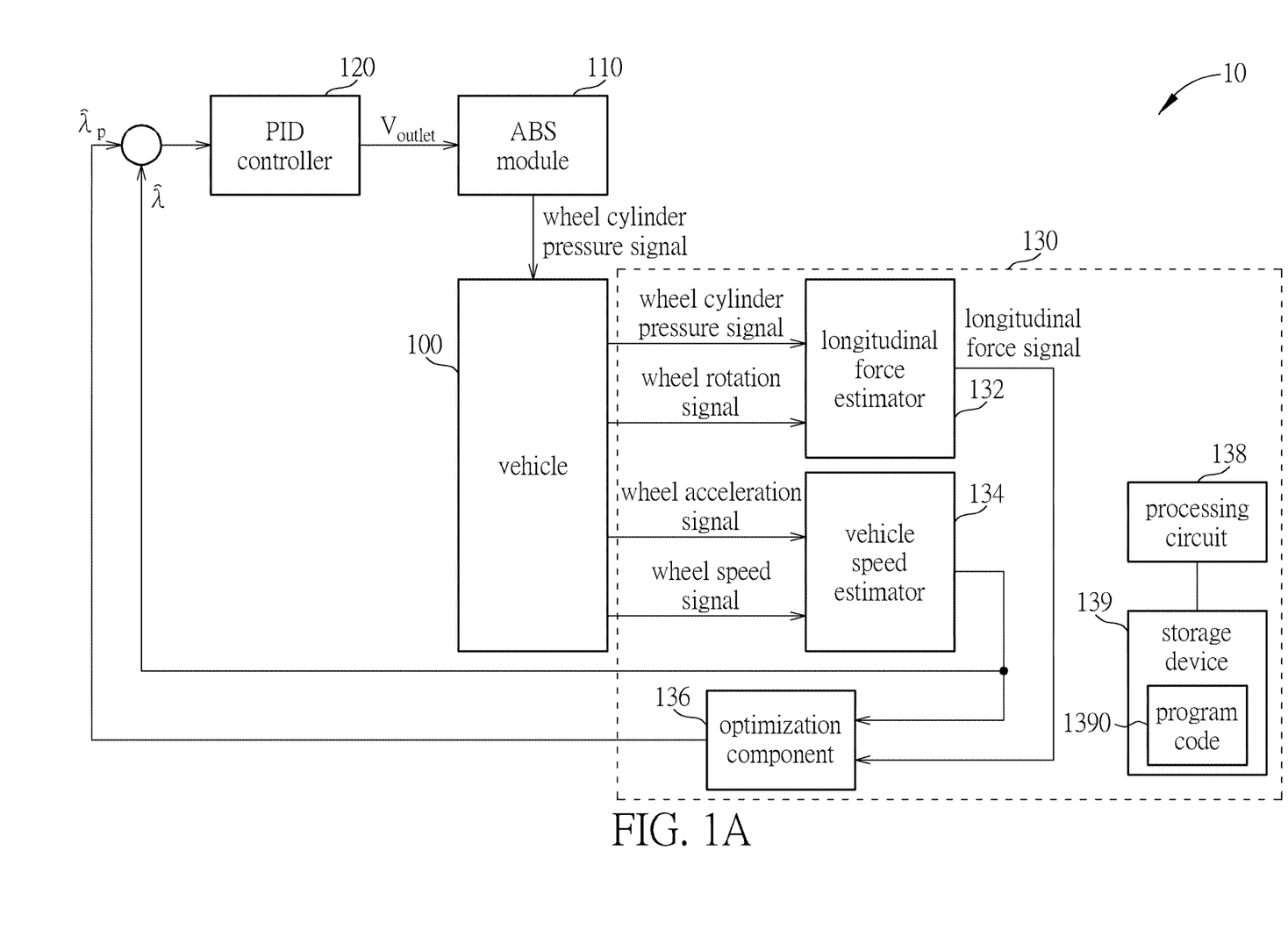
FIG. 1A is a schematic diagram of a surface adaptation system according to an example of the present invention.

FIG. 1A is a schematic diagram of a surface adaptation system 10 according to an example of the present invention. The surface adaptation system 10 may include a vehicle 100, an anti-lock braking system (ABS) module 110 configured in the vehicle 100, a proportional-integral-derivative (PID) controller 120, and a surface adaptation device 130. The ABS module 110 receives an outlet signal $V_{outlet}$ from the PID controller 120 and transmits a wheel cylinder pressure signal to the vehicle 100. The PID controller 120 configured in the vehicle 100 is a control loop mechanism employing feedback and restores a currently measured wheel slip signal $\hat{\lambda}$ to an optimized wheel slip signal $\hat{\lambda}_p$ by means of continuously modulated control. The vehicle 100 outputs the wheel cylinder pressure signal (associated with, for example, a brake secondary cylinder hydraulic pressure), a wheel rotation signal (associated with, for example, wheel rotation angles), a vehicle acceleration signal (associated with, for example, vehicle accelerations) and a wheel speed signal (associated with, for example, wheel angular velocities) to the surface adaptation device 130. The surface adaptation device 130 provides the currently measured wheel slip signal $\hat{\lambda}$ (associated with, for example, a current wheel slip) and the optimized wheel slip signal $\hat{\lambda}_p$ (associated with, for example, a wheel slip threshold) to the PID controller 120.

In some embodiments, the surface adaptation device 130 may include a longitudinal force estimator 132, a vehicle speed estimator 134, an optimization component 136, a processing circuit 138, and a storage device 139. The longitudinal force estimator 132 receives the wheel cylinder pressure signal and the wheel rotation signal from the vehicle 100, and transmits a longitudinal force signal (associated with, for example, longitudinal forces) to the optimization component 136. The vehicle speed estimator 134 receives the vehicle acceleration signal and the wheel speed signal from the vehicle 100, and transmits the currently measured wheel slip signal $\hat{\lambda}$ to the optimization component 136. The optimization component 136 outputs the optimized wheel slip signal $\hat{\lambda}_p$ according to the currently measured wheel slip signal λ̂ and the longitudinal force signal. The processing circuit 138 may be a microprocessor, an application specific integrated circuit (ASIC), a central processing unit (CPU), or a graphics processing unit (GPU), but not limited thereto. The storage device 139 may be any data storage device which is able to store a program code 1390 to be accessed and executed by the processing circuit 138. Examples of the storage device 139 may include a read-only memory (ROM), a flash memory, a random-access memory (RAM), a hard disk, an optical data storage device, a non-volatile storage device, and a non-transitory computer-readable medium, but not limited thereto.

In brief, the surface adaptation device 130 is utilized to implement a surface adaptation method; more specifically, the surface adaptation device 130 configured in the vehicle 100 aims to increase efficiency for anti-lock braking and to reduce costs. The longitudinal force estimator 132, the vehicle speed estimator 134, and the optimization component 136 may be directed by the processing circuit 138, which may dictate surface adaptation.

Figure 1B:
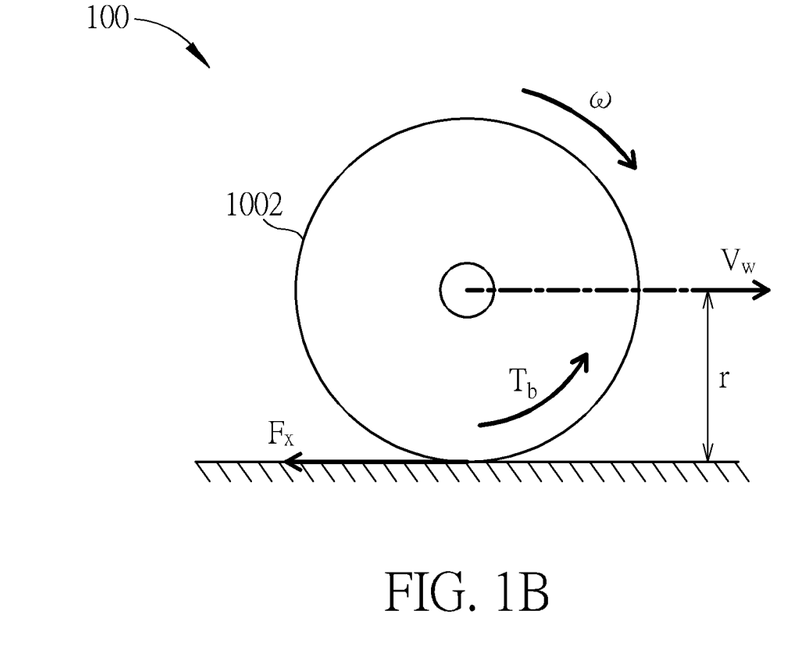
FIG. 1B is a schematic diagram of a wheel in the vehicle of FIG. 1.

FIG. 1B is a schematic diagram of a wheel 1002 in the vehicle 100 of FIG. 1. In FIG. 1B, the wheel 1002 has an effective rotational radius r. How fast the wheel 1002 rotates may be expressed as angular velocity ω of the wheel 1002 (also referred to as a wheel angular velocity). How fast the vehicle 100 moves may be expressed as vehicle speed $V_W$. Either a longitudinal force $F_x$ or a braking torque $T_b$ may be applied to the wheel 1002.

Figure 1C:
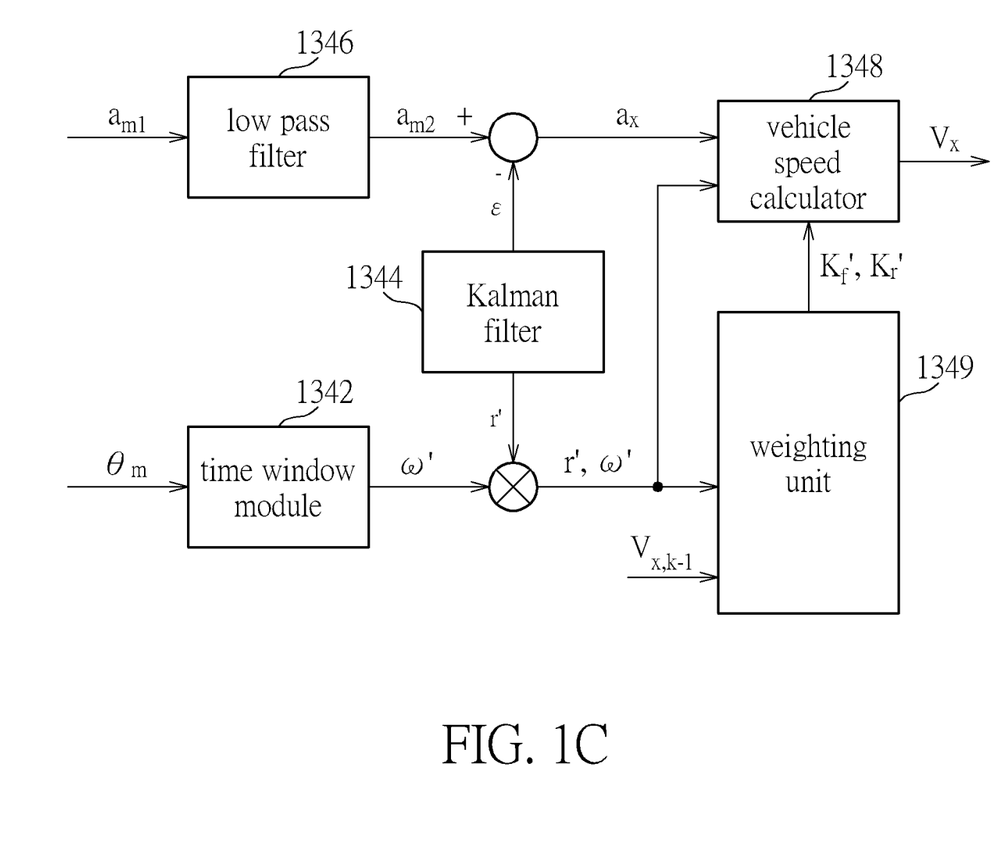
FIG. 1C is a schematic diagram of the vehicle speed estimator of FIG. 1.

FIG. 1C is a schematic diagram of the vehicle speed estimator 134 of FIG. 1. The vehicle speed estimator 134 includes a time window module 1342, a Kalman filter 1344, a low pass filter 1346, a vehicle speed calculator 1348, and a weighting unit 1349. The time window module 1342 obtains a wheel rotation angle signal $θ_m$ with noises and outputs a wheel angular velocity signal ω'. The Kalman filter 1344 outputs a measurement bias signal ε and an effective rotational radius signal r'. The low pass filter 1346 obtains a first acceleration signal $a_{m1}$ with bias and noises, and outputs a second acceleration signal $a_{m2}$ with bias (but without noises). The weighting unit 1349 receives a previous vehicle speed signal $V_{x,k-1}$, the wheel angular velocity signal ω', and the effective rotational radius signal r', and outputs a weighting signal $K_f'$, and a weighting signal $K_r'$. The vehicle speed calculator 1348 receives the weighting signal $K_f'$, the weighting signal $K_r'$, a longitudinal acceleration signal $a_x$, the wheel angular velocity signal ω', and the effective rotational radius signal r', and outputs a vehicle speed signal $V_x$.

As set forth above, to estimate the vehicle speed accurately and precisely, a rough estimation is first developed according to an acceleration signal $a_m$ from an accelerometer and wheel rotation angle $θ_m$ from a wheel speed sensor. Because bias and high frequency noise may impact the measurement of the (longitudinal) acceleration by the accelerometer, the low pass filter 1346 is utilized to solve high frequency noise problems of acceleration signals. Elimination of measurement bias is then performed according to the measurement bias ε estimated by the Kalman filter 1344 so as to obtain an accurate longitudinal acceleration $a_x$ of the vehicle 100. The wheel rotation angle $θ_m$ may be detected by the wheel speed sensor. A time window module 1342 is adopted to subsequently obtain the angular velocity ω of the wheel, and resolution problems of wheel rotation angle may be solved. Moreover, the wheel angular velocity is determined according to the effective rotational radius r of the wheel, which is estimated by the Kalman filter 1344. The vehicle speed is calculated according to information such as weightings (for instance, the weighting $K_f$ or the weighting $K_r$), the wheel angular velocity and the acceleration. The weightings may be determined according to the wheel slip λ.

In other words, (absolute) vehicle speed is estimated by the vehicle speed estimator 134 more accurately because the effective rotational radius r of the wheel 1002 and measurement bias of an accelerometer are taken into account. In this manner, wheel slips between a road surface and the wheel 1002 may be evaluated with precise accuracy.

Figure 2:
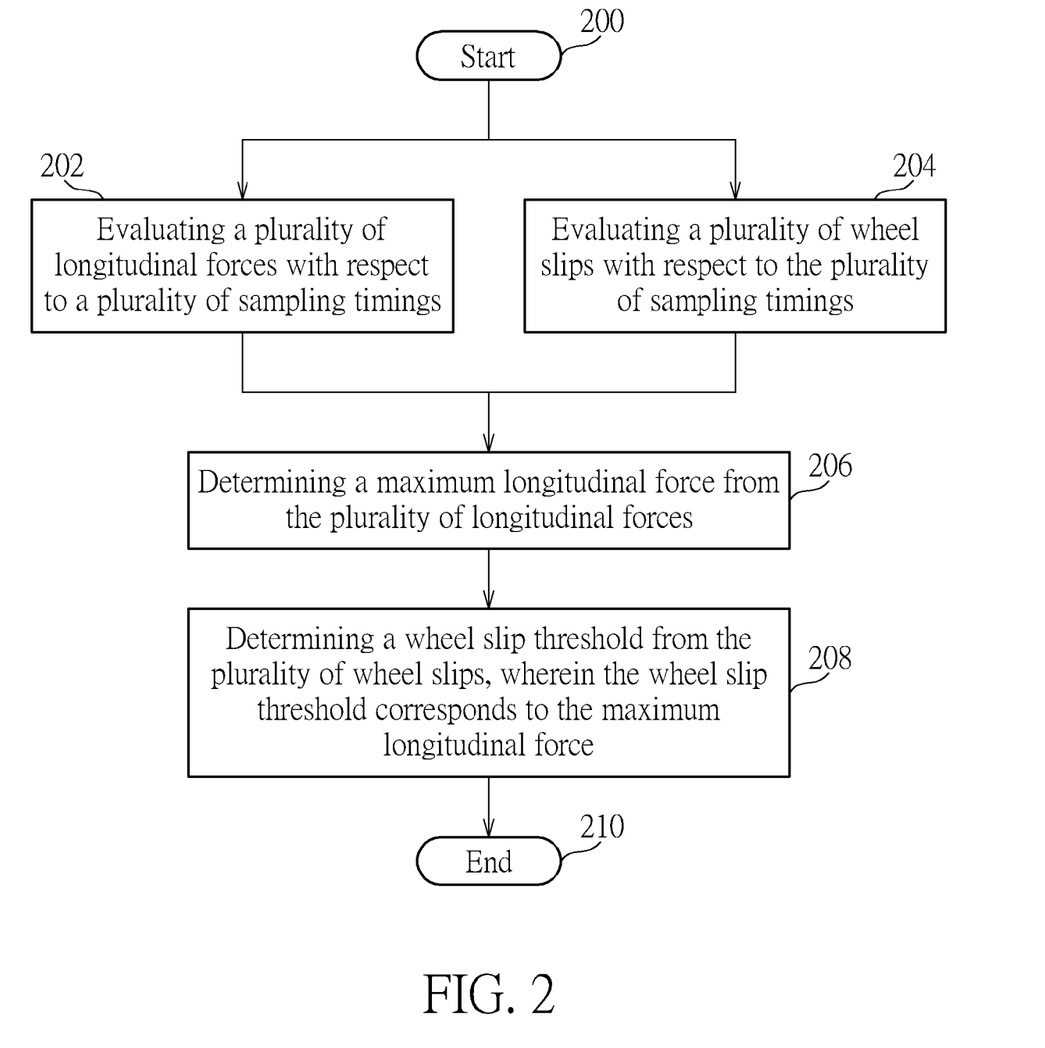
FIG. 2 is a flowchart of a surface adaptation method according to an example of the present invention.

FIG. 2 is a flowchart of a surface adaptation method 20 according to an example of the present invention. The surface adaptation method 20 may be compiled into the program code 1390 and utilized in the surface adaptation system 10. The surface adaptation method 20 includes the following steps:

Step 200: Start.

Step 202: Evaluating a plurality of longitudinal forces with respect to a plurality of sampling points.

Step 204: Evaluating a plurality of wheel slips with respect to the plurality of sampling points.

Step 206: Determining a maximum longitudinal force from the plurality of longitudinal forces.

Step 208: Determining a wheel slip threshold from the plurality of wheel slips, wherein the wheel slip threshold corresponds to the maximum longitudinal force.

Step 210: End.

In some embodiments, Step 202 and Step 204 may be performed at the same time. In some embodiments, one longitudinal force with respect to a sampling point corresponds to a specific wheel slip. In some embodiments, a sampling point may be a sampling timing.

In Step 202, a plurality of longitudinal forces are evaluated with respect to a plurality of sampling points. In some embodiments, a Kalman filter 1344 is used to design an estimator (for instance, the longitudinal force estimator 132). In some embodiments, estimation of a longitudinal force involves a wheel dynamic model. Moreover, according to equation of the wheel dynamic model, a relationship between a braking force of a wheel (for instance, the wheel 1002), a braking torque and a reduction of wheel speed (also referred to as wheel rotational speed or angular velocity of the wheel) may be calculated and expressed as:

$$\dot{ω}=[T_b-rF_x-b_wω]/I_w \qquad (1)$$

Wherein ω is the angular velocity of the wheel, $T_b$ is the braking torque, $b_w$ is a bearing damping coefficient of the wheel, $I_w$ is moment of inertia of the wheel, and $F_x$ is a longitudinal force of the wheel.

Based on a wheel transient behavior, a steady-state wheel longitudinal force $F_x$ is generated after a wheel with a wheel slip change (also referred to as a change of wheel slips) travels certain distance. Dynamic changes of wheel slips are simulated as a first-order low-pass filter. A time constant may mainly depend on a relaxation length of the wheel and the vehicle speed $V_x$. A transfer function $H_c(s)$ of the first-order low-pass filter may be expressed as:

$$H_c(s) = \frac{Y(s)}{U(s)} = \frac{1}{\tau_{LPF}s+1} \qquad (2)$$

$$\tau_{LPF} = \frac{l_{rel}}{v_x} \qquad (3)$$

Wherein $\tau_{LPF}$ is the time constant of the first-order low-pass filter, and $l_{rel}$ is the relaxation length of the wheel. In other words, a Laplace transform U(s) of an input wheel slip (to the first-order low-pass filter) divided by a Laplace transform Y(s) of an output wheel slip (from the first-order low-pass filter) equals a sum of one plus a product of the time constant multiplied by a complex variable (that is to say, $\tau_{LPF}s+1$) in some embodiments.

To estimate the longitudinal force $F_x$ in Step 202, a (closed loop) interference estimator and the Kalman filter 1344 may be used. A state vector may be $x=[\theta \ \omega \ F_x]^T$. An input signal may be $u=T_b$. An output signal may be $y=\theta$. A signal equation may be calculated according to equation (4); a state space representation may be determined according to equations (5) and (6).

$$T_b = P_{w/c} A_{w/c} \mu_{pad} r_{disc} \tag{4}$$

$$\dot{x} = A_{lf} x + B_{lf} u \tag{5}$$

$$y = C_{lf} x \tag{6}$$

$$A_{lf} = \begin{bmatrix} 0 & 1 & 0 \\ 0 & 0 & -\frac{r}{I_w} \\ 0 & 0 & 0 \end{bmatrix}, B_{lf} = \begin{bmatrix} 0 & \frac{1}{I_w} & 0 \end{bmatrix}^T, C_{lf} = [1 \ 0 \ 0] \tag{7}$$

Wherein $P_{w/c}$ is a brake secondary cylinder hydraulic pressure (also referred to as a hydraulic pressure of a brake secondary cylinder or a wheel secondary cylinder pressure), $A_{w/c}$ is a brake secondary cylinder piston area (also referred to as a piston area of the brake secondary cylinder), $\mu_{pad}$ is a piston disc friction coefficient (also referred to as a friction coefficient between a piston of the brake secondary cylinder and a disc), $r_{disc}$ is a disk radius (also referred to as a radius of the disk), $A_{lf}$ is a system matrix of the longitudinal force estimator 132, $B_{lf}$ is an input matrix of the longitudinal force estimator 132, and $C_{lf}$ is an output matrix of the longitudinal force estimator 132. The brake secondary cylinder hydraulic pressure $P_{w/c}$ may be found out from a relationship between a return pump voltage and a delivery valve opening degree. The (closed loop) interference estimator is used to estimate the longitudinal force of each wheel, and may be expressed as:

$$\hat{x}_{k+1} = \Phi_{lf} \hat{x}_k + \Gamma_{lf} u_k + L_{lf}(y_k - C_{lf} \hat{x}_k) \tag{8}$$

$$\hat{y}_k = C_{lf} \hat{x}_k \tag{9}$$

Wherein $\Phi_{lf}$ and $\Gamma_{lf}$ may be the $A_{lf}$ and $B_{lf}$ matrices of a discrete system respectively, $L_{lf}$ may be a gain value matrix of the (closed loop) interference estimator, $\hat{x}_k$ is a state matrix, $u_k$ is a braking torque, and $y_k$ is rotation angle of the wheel. The state vector $\hat{x}_k$ may include information such as the rotation angle of the wheel, angular velocity of the wheel, and the braking force. The longitudinal force is estimated according to the braking torque, which is input into a wheel model, and the rotation angle, which is output from the wheel model. The gain value matrix $L_{lf}$ may be calculated by solving a Riccati equation. The feedback gain value may be manipulated according to equations (10) and (11).

$$P_{lf,k} = M_{lf,k} - M_{lf,k} H_{lf}^T (H_{lf} M_{lf,k} H_{lf}^T + R)^{-1} H_{lf} M_k \tag{10}$$

$$M_{lf,k+1} = F_{lf} P_{lf,k} F_{lf}^T + \Gamma Q \Gamma^T \tag{11}$$

Wherein $P_k$ is an error covariance matrix, and $M_k$ is an update rule of an estimate covariance matrix. The Kalman feedback gain matrix L may be manipulated according to an equation (12).

$$L_{lf} = P_{lf,k} H_{lf}^T R^{-1} \tag{12}$$

As set forth above, in some embodiments, the plurality of longitudinal forces may be evaluated according to a Kalman filter (for instance, the Kalman filter 1344) in Step 202. One or at least one of the plurality of longitudinal forces is associated with a brake secondary cylinder hydraulic pressure, a disk radius, a brake secondary cylinder piston area, or a piston disc friction coefficient.

In Step 204, a plurality of wheel slips are evaluated with respect to the plurality of sampling points. In some embodiments, each of the plurality of wheel slips is determined according to an effective rotational radius, a wheel angular velocity, and/or a vehicle speed. In some embodiments, each of the plurality of wheel slips is determined according to an effective rotational radius, a wheel angular velocity at a sampling point, and/or a vehicle speed at a previous sampling point.

To increase accuracy of vehicle speed evaluation, in some embodiments, an (absolute) vehicle speed is estimated according to information from a wheel speed sensor and an accelerometer. Before estimation of a vehicle speed, wheel speed data and acceleration data should be corrected to solve noise and bias problems of absolute acceleration information measured by the accelerometer and wheel speed information measured by the wheel speed sensor.

To increase accuracy of wheel speed or angular velocity evaluation, in some embodiments, a plurality of angular velocity signals are averaged to calculate an wheel angular velocity at a sampling point. The plurality of angular velocity signals are successive and detected in a first time interval. Each of the plurality of angular velocity signals is calculated by counting a number of turns in a second time interval. A length of the first time interval is a multiple of a length of the second time interval.

Figure 3:
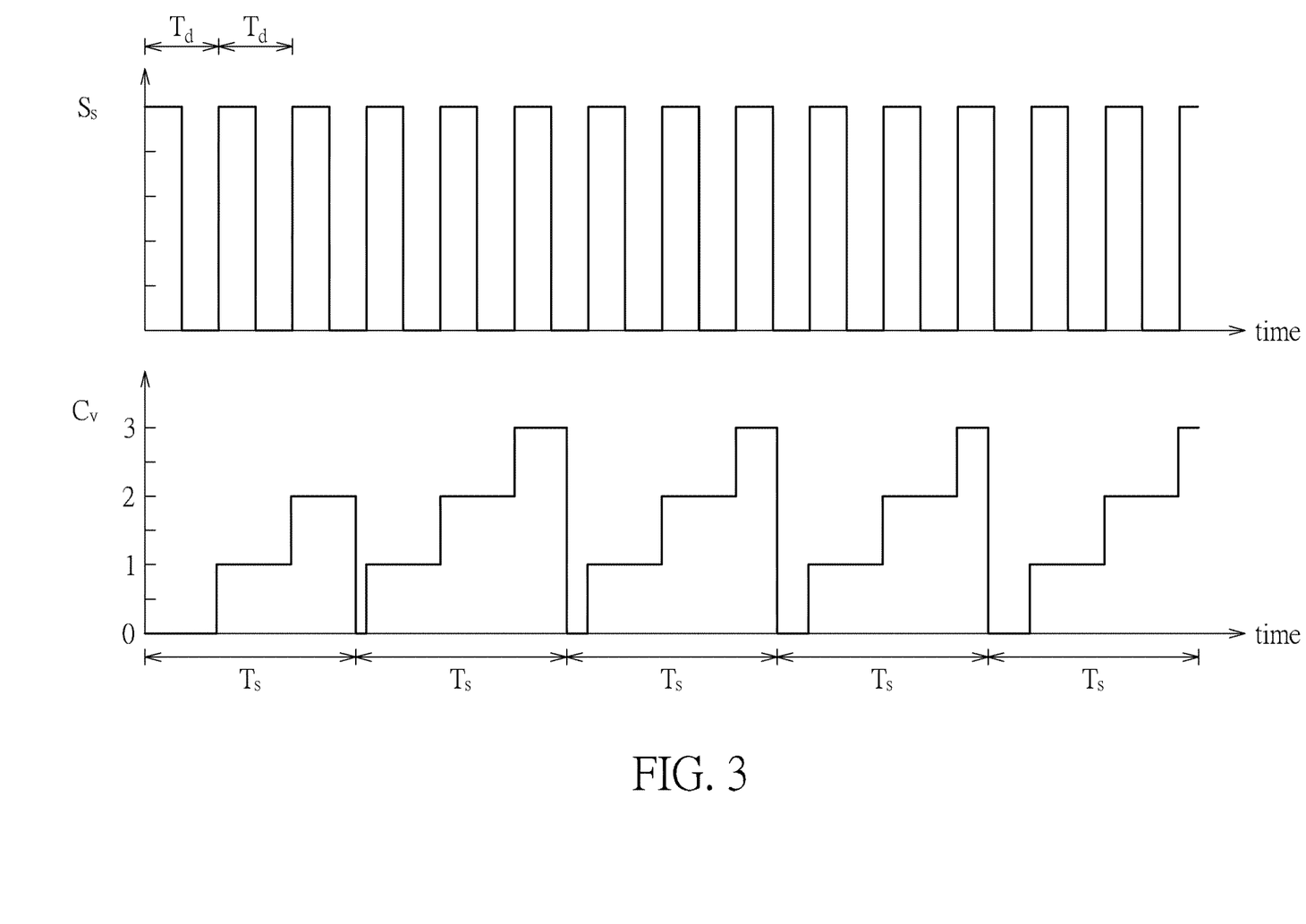
FIG. 3 is a schematic diagram of rotation angle measurement by a Hall sensor according to an example of the present invention.

Specifically, suppose that the target vehicle is equipped with a wheel speed sensor of 50 teeth satisfying ABS standard. FIG. 3 is a schematic diagram of rotation angle measurement by a Hall sensor (also referred to as a Hall effect sensor) according to an example of the present invention. The Hall sensor is in fact an angle sensor. However, if the angle is known, the angular velocity may be determined when changes in angle are monitored with respect to time. The Hall sensor senses variation in flux between a (ferrous) gear teeth and a magnet in such a way that an axis of magnetization of the magnet is pointing towards a surface of the gear teeth. Signals from the Hall sensor is converted into a digital value. A digital signal processing, which is subsequently performed, may introduce an uncertainty from quantization that is greater at higher wheel speeds. In some embodiments, an average approach (to angular velocity signals) is taken so as to lessen extremely demanding timing synchronization requirements, which may suffer from the loss of accuracy at high speeds.

Square wave signal Ss with a fixed period Td generated by the Hall sensor is simulated at the top of FIG. 3 with the target vehicle in a constant speed (for example, 25 kilometer per hour). Counting process of a digital signal processor (DSP) with a quadrature encoder pulse (QEP) circuit is simulated at the bottom of FIG. 3. When the digital signal processor is in operation, rising pulse edges are detected for counting. A count value of a count signal Cv is output at (each) sampling point (or after each period Ts), meaning that the QEP circuit currently obtains (wheel) a rotation angle signal. Meanwhile, the counter is reset. The count values computed by the counter fluctuates because a sampling point of the QEP circuit may not be aligned with a rising timing of a rising pulse edge even if the angular velocity of the wheel is constant over time.

In some embodiments, the (wheel) rotation angle signals captured by the QEP circuit (namely, Hall signals from the Hall sensor) are simulated. The (wheel) rotation angle signals from the dynamic simulation software are quantized to match a resolution of 50 teeth per revolution. The (wheel) rotation angle signals are differentiated to obtain (wheel) angular velocity signals. To reduce resolution influence of quantization of the (wheel) rotation angle signals, quantized (wheel) angular velocity signals in every certain seconds (for instance, in every 0.08 seconds) are averaged to calculate an a wheel angular velocity at a sampling point.

Figure 4:
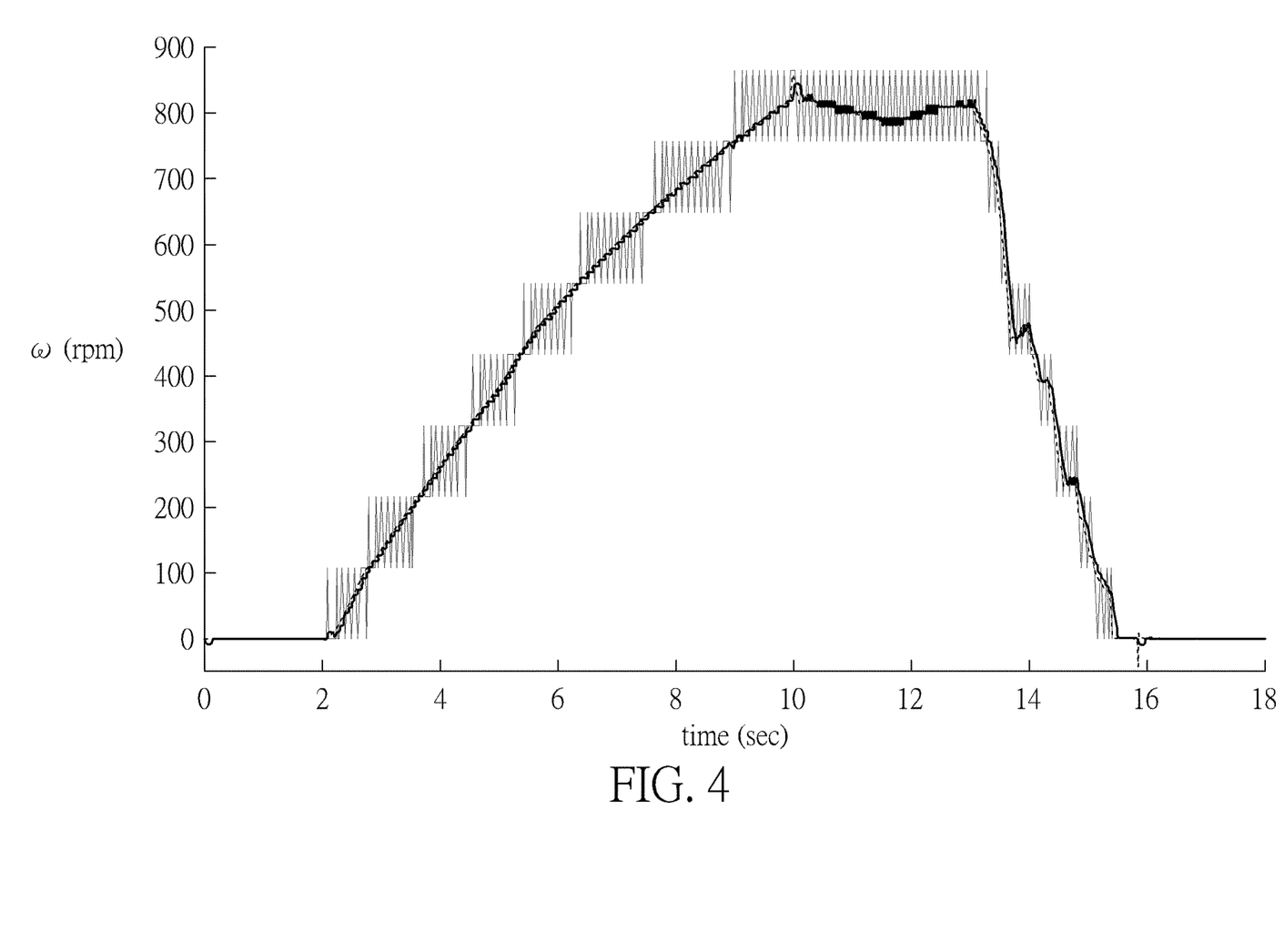
FIG. 4 is a schematic diagram of a simulation of angular velocity signals according to an example of the present invention.

FIG. 4 is a schematic diagram of a simulation of angular velocity signals according to an example of the present invention. In FIG. 4, measurement (wheel) angular velocity signals measured by the Hall sensor and captured by the QEP are presented by a thin solid curve. Wheel angular velocities (namely, average signals obtained by averaging angular velocity signals) are presented by a thick solid curve. Simulation of angular velocity of a wheel by means of BikeSim is presented by a thin dashed curve. As shown by the thin solid curve in FIG. 4, the measurement (wheel) angular velocity signals after quantization fluctuates. After the time window module 1342 averages every eight signals of the measurement (wheel) angular velocity signals, resolution issues due to quantization of the measurement (wheel) angular velocity signals may be alleviated. As shown by the thick solid curve which is rather flat, most fluctuations are eliminated in the average signals obtained by averaging angular velocity signals. The difference between the average signals and the simulation of BikeSim is small.

In some embodiments, an effective rotational radius and/or an acceleration measurement bias is evaluated according to a Kalman filter (for instance, the Kalman filter 1344). If a (longitudinal) accelerometer is not arranged properly (for example, horizontally placed), signals may be susceptible to bias (also referred to as deviation). Additionally, an effective rotational radius (also referred to as effective rolling radius) of the wheel may vary with load change. If the wheel slip between a road surface (of the ground) and the wheel is small, the Kalman filter 1344 may be adopted to estimate the effective rotational radius of the wheel and measurement bias of acceleration. The state vector may be $$x = \left[\begin{array}{cc} \dfrac{1}{r} & \dfrac{\varepsilon}{r} \end{array}\right]^T;$$

the output signal may be $y = \dot{\omega}$. The relationship may be expressed as:

$$x_{k+1} = A_{acc} x_k \tag{13}$$

$$y_k = C_{acc,k} x_k \tag{14}$$

$$A_{acc} = \begin{bmatrix} 1 & 0 \\ 0 & 1 \end{bmatrix}, C_{acc,k} = [\,a_{m,k}\ -1\,] \tag{15}$$

Wherein $A_{acc}$ is a system matrix, $C_{acc}$ is an output matrix, $a_m$ is an acceleration measurement component, $\varepsilon$ is an acceleration measurement bias (also referred to as a measurement bias of acceleration or a measurement deviation of acceleration), $\omega$ is an angular acceleration of the wheel, and r is the effective rotational radius of the wheel. In other words, a closed loop state estimation is computed by means of the Kalman filter 1344 together with a feedback gain value matrix.

$$\hat{x}_{k+1} = \Phi_{acc}\hat{x}_k + \Gamma_{acc}u_k + L_{acc}(y_k - C_{acc}\hat{x}_k) \tag{16}$$

$$\hat{y}_k = C_{acc}\hat{x}_k \tag{17}$$

Wherein $\Phi_{acc}$ and $\Gamma_{acc}$ may be the $A_{acc}$ and $B_{acc}$ matrices of a discrete system respectively, and $L_{acc}$ may be a gain value matrix of an estimator. $L_{acc}$ may be calculated by solving a Riccati equation. The feedback gain value may be manipulated according to equations (18) and (19).

$$P_{acc,k} = M_{acc,k} - M_{acc,k} H_{acc}^T (H_{acc} M_k H_{acc}^T + R)^{-1} H_{acc} \tag{18}$$

$$M_{acc,k+1} = F_{acc} P_{acc,k} F_{acc}^T + \Gamma Q \Gamma^T \tag{19}$$

Wherein $P_{acc,k}$ is an error covariance matrix, and $M_{acc,k}$ is an update rule of an estimate covariance matrix. The Kalman feedback gain matrix $L_{acc}$ may be manipulated according to an equation (20).

$$L_{acc} = P_{acc,k} H_{acc}^T R^{-1} \tag{20}$$

Because an estimation acceleration bias error may increase when the wheel slip between the road surface and the wheel is too large, a measurement acceleration bias may be updated after a wheel slip of a front wheel (also referred to as a first wheel) and a wheel slip of a rear wheel (also referred to as a second wheel) are less than a threshold value for a while.

Information of the wheel angular velocity and the acceleration are manipulated according to a weighting approach used in the vehicle speed estimator 134. A magnitude of the wheel slip would affect a weighting for the wheel angular velocity and a weighting for the acceleration. If the wheel slip between the road surface and the wheel is large, the acceleration would be dominant in a selection of the vehicle speed estimator 134. In other words, the vehicle speed estimator 134 basically selects the acceleration to perform estimation. On the other hand, if the wheel slip between the road surface and the wheel is small, the wheel angular velocity would be dominant in a selection of the vehicle speed estimator 134. The relationship may be expressed as:

$$\hat{V}_{x,k} = \hat{V}_{x,k-1} + a_{x,k} T_s + K_1 \left[\omega_k - \frac{1}{r}(\hat{V}_{x,k-1} + a_{x,k} T_s)\right] \tag{21}$$

$$K_v = \frac{K_1}{r} \tag{22}$$

$$\hat{V}_{x,k} = K_v r \omega_k + (1 - K_v)(\hat{V}_{x,k-1} + a_{x,k} T_s) \tag{23}$$

Wherein $a_x$ is a (longitudinal vehicle) acceleration, $T_s$ is a system unit time, $\hat{V}_x$ is a vehicle speed estimated by the vehicle speed estimator 134, $K_1$ is a wheel speed estimator gain (also referred to as a gain value of the wheel angular velocity estimator or the wheel speed estimator), and $K_v$ is a vehicle speed estimator gain (also referred to as a gain value of the vehicle speed estimator 134). That is to say, a vehicle speed at a sampling point is determined according to a previous vehicle speed at a previous sampling point, a vehicle acceleration at the sampling point, an angular velocity estimator gain, a vehicle speed estimator gain, a wheel angular velocity at the sampling point, and/or an effective rotational radius.

Figure 5:
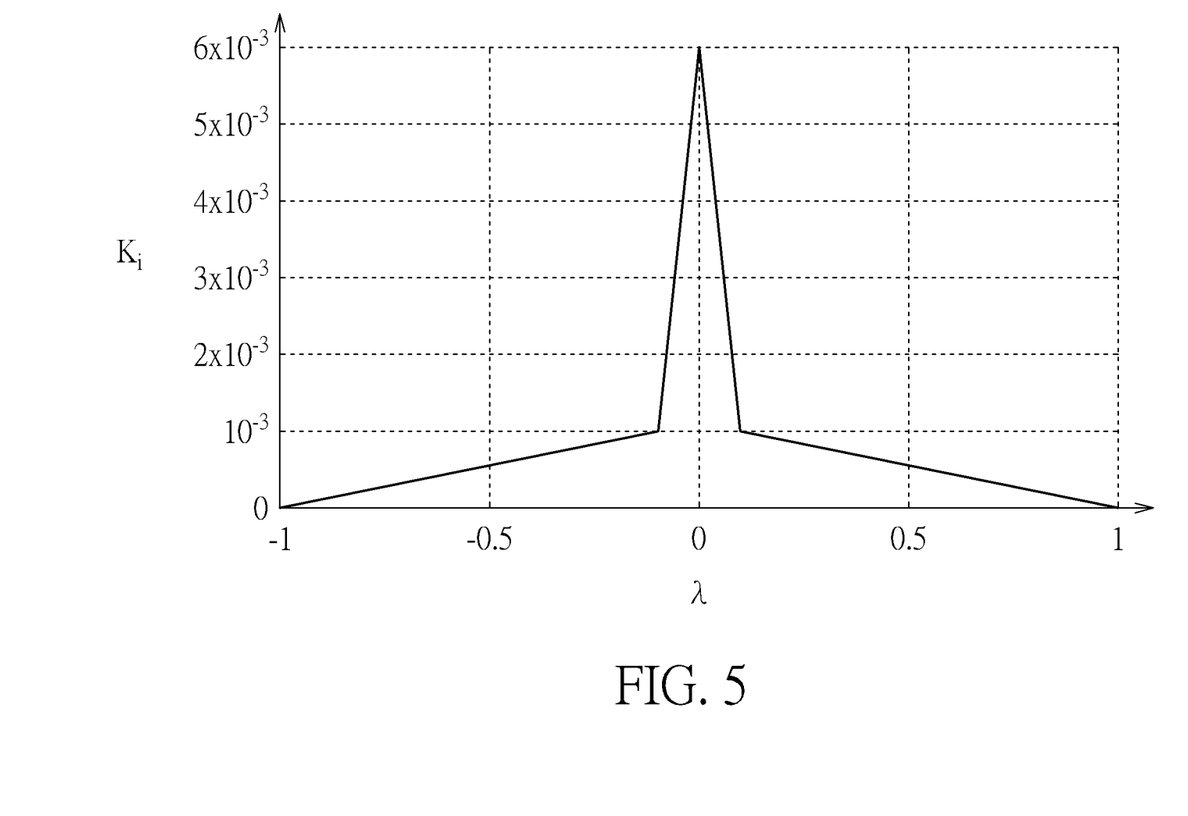
FIG. 5 is a schematic diagram of weighting as a function of wheel slip according to an example of the present invention.

Please refer to FIG. 5. FIG. 5 is a schematic diagram of weighting as a function of wheel slip according to an example of the present invention. It is noteworthy that either a weighting for an angular velocity of each wheel or a weighting for the acceleration may be determined according to a wheel slip of each wheel because resolution problems of the quantized wheel rotation angle would directly affect estimation results of the vehicle speed (for example, an estimated vehicle speed tends to fluctuate) when the wheel angular velocity becomes a dominant influence in the selection of the vehicle speed estimator 134. Specifically, the relationship may be expressed as:

$$\hat{V}_{x,k}=K_f r_{f,k} \omega_{f,k}+K_r r_{r,k} \omega_{r,k}+(1-K_f-K_r)(\hat{V}_{x,k-1}+a_{x,k}T_s) \quad (24)$$

Wherein $\omega_f$ is the angular velocity of the front wheel, $\omega_r$ is the angular velocity of the rear wheel, $K_f$ is a gain value of the angular velocity of the front wheel, and $K_r$ is a gain value of the angular velocity of the rear wheel. That is to say, either a weighting for an angular velocity of each wheel or a weighting for the acceleration may be determined according to a wheel slip of each wheel. In some embodiments, a vehicle speed at a sampling point is determined according to a previous vehicle speed at a previous sampling point, a vehicle acceleration at the sampling point, an angular velocity estimator gain of a first wheel, a vehicle speed estimator gain of the first wheel, a wheel angular velocity of the first wheel at the sampling point, an effective rotational radius of the first wheel, an angular velocity estimator gain of a second wheel, a vehicle speed estimator gain of the second wheel, a wheel angular velocity of the second wheel at the sampling point, or an effective rotational radius of the second wheel.

As set forth above, in Step 204, the wheel slip may be calculated and expressed as:

$$\lambda = \frac{r\omega_{(k)} - \hat{V}_{x,k-1}}{\hat{V}_{x,k-1}} \quad (25)$$

Wherein $\lambda$ is the wheel slip between the road surface and the wheel. As shown in FIG. 5, a (gain value) weighting of a vehicle speed estimation may be decided according to a wheel slip since weighting is a function of wheel slip. In FIG. 5, i appearing as a subscript indicate the gain value of the angular velocity of the front wheel or the gain value of the angular velocity of the rear wheel. In other words, the angular velocity estimator gain is associated with one of the plurality of wheel slips. Alternatively, either the angular velocity estimator gain of the first wheel or the angular velocity estimator gain of the second wheel is associated with one of the plurality of wheel slips. When the wheel slip between the road surface and a specific wheel is small (that is, how fast the specific wheel moves is close to an absolute vehicle speed), a weighting for the angular velocity of the specific wheel rises, and the angular velocity of the specific wheel would be dominant in a selection of the vehicle speed estimator 134. If both the wheel slip of the front wheel and the wheel slip of the rear wheel are large, the (longitudinal) acceleration would be dominant in a selection of the vehicle speed estimator 134. By considering weightings for angular velocity of all the wheels and a weighting for the (longitudinal) acceleration, accuracy of the vehicle speed estimation may be improved efficiently.

As set forth above, to estimate the vehicle speed accurately and precisely, a rough estimation is first developed according to the first acceleration signal $a_{m1}$ from an accelerometer and wheel rotation angle (for instance, the wheel rotation angle signal $\theta_m$) from a wheel speed sensor. Because bias and high frequency noise may impact the measurement of the (longitudinal) acceleration by the accelerometer, the low pass filter 1346 is utilized to solve high frequency noise problems of acceleration signals. Elimination of measurement bias is then performed according to the measurement bias (for instance, the measurement bias signal $\varepsilon$) estimated by the Kalman filter 1344 so as to obtain an accurate longitudinal acceleration of the vehicle 100 (for instance, the longitudinal acceleration signal $a_x$). The wheel rotation angle may be detected by the wheel speed sensor. A time window module 1342 is adopted to subsequently obtain the angular velocity of the wheel (for instance, the wheel angular velocity signal $\omega'$), and resolution problems of wheel rotation angle may be solved. Moreover, the wheel angular velocity is determined according to the effective rotational radius of the wheel (for instance, the effective rotational radius signal r'), which is estimated by the Kalman filter 1344. The vehicle speed is calculated according to information such as weightings (for instance, weightings in the weighting signal $K_f'$ or the weighting signal $K_r'$), the wheel angular velocity and the acceleration. The weightings may be determined according to the wheel slip $\lambda$.

In Step 206, a maximum longitudinal force may be selected from the plurality of longitudinal forces in some embodiments. In some embodiments, a maximum longitudinal force may be calculated from the plurality of longitudinal force according to numerical methods such as interpolation. Similarly, in Step 208, a wheel slip threshold (aiming to serve as an optimized wheel slip) may be selected from the plurality of wheel slips in some embodiments. In some embodiments, a wheel slip threshold may be calculated from the plurality of wheel slips according to numerical methods such as interpolation. The wheel slip threshold corresponds to the maximum longitudinal force; in other words, when the maximum longitudinal force is applied to the vehicle, the vehicle is slipping and experiences the wheel slip threshold. To optimize a braking force for a specific road surface, a currently measured wheel slip is detected and compared with the wheel slip threshold. When the currently measured wheel slip is less than the wheel slip threshold, a braking force is allowed to increase or to be applied. When the currently measured wheel slip is greater than the wheel slip threshold, the braking force is forbidden to increase or to be applied.

Figure 6:
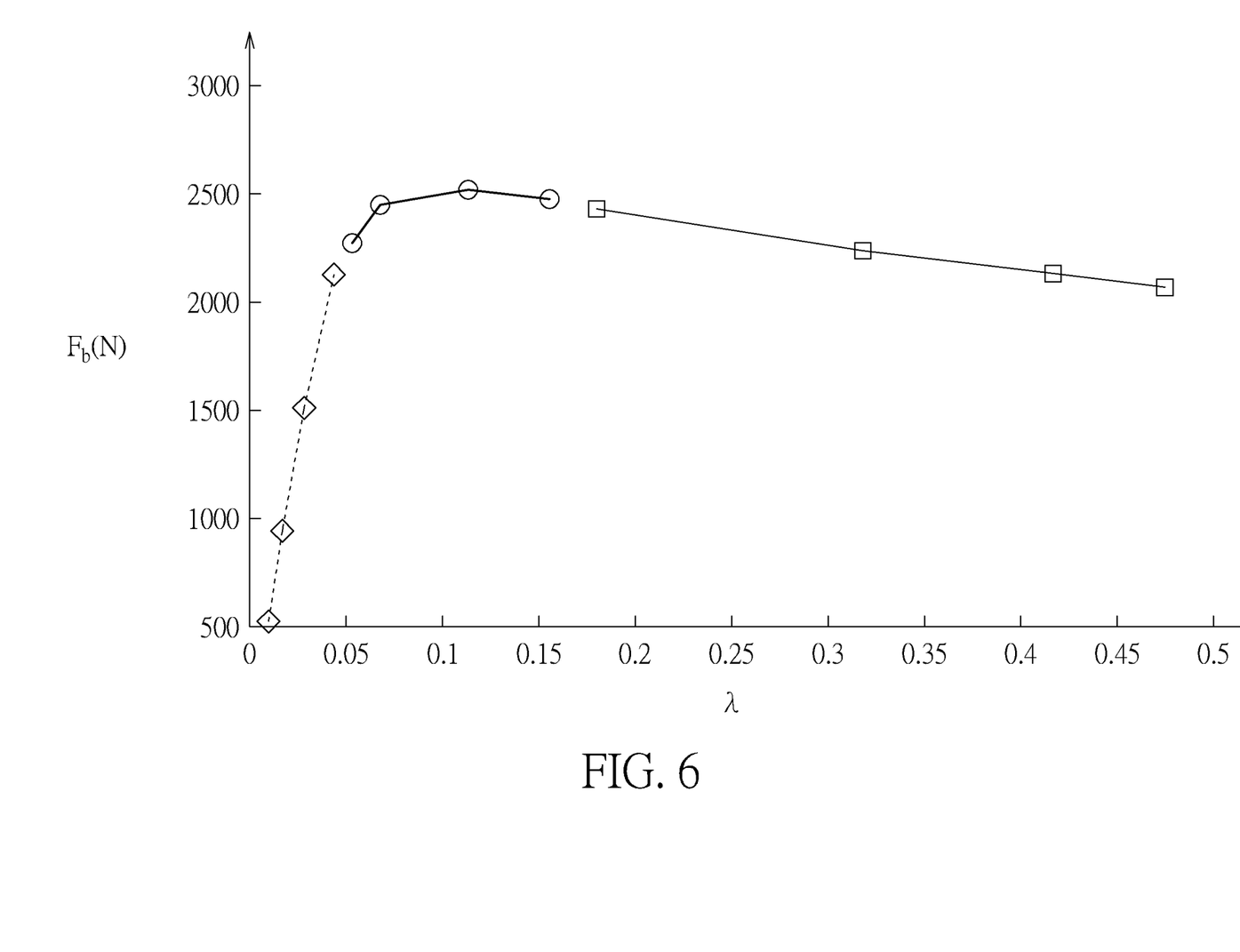
FIG. 6 is a schematic diagram of a relationship between longitudinal forces and wheel slips according to an example of the present invention.

Specifically, the surface adaptation method 20 aims to find out the maximum deceleration provided by a road surface, which contacts the wheel. With the maximum deceleration, the maximum longitudinal force corresponding to the road surface may be determined. In the surface adaptation method 20, a road surface is recognized indirectly. Please refer to FIG. 6. FIG. 6 is a schematic diagram of a relationship between longitudinal forces and wheel slips according to an example of the present invention. A longitudinal force is extracted in each successive timing by another time window module in Step 202 of the surface adaptation method 20. A current longitudinal force at a current sampling point and previous longitudinal forces at previous sampling points are output as a longitudinal force matrix M simultaneously, and the longitudinal force matrix M may be expressed as:

$$M = [\hat{F}_{b,k} \ \hat{F}_{b,k-1} \ \hat{F}_{b,k-2} \ldots \hat{F}_{b,k-n+1}] \quad (26)$$

Wherein n is a number of samples monitored by the time window module. In Step 204 of the surface adaptation method 20, each wheel slip is calculated according to the vehicle speed provided by the vehicle speed estimator 134 and the wheel angular velocity. Because the longitudinal forces and the wheel slips are required to be manipulated together, a wheel slip is extracted in each successive timing by another time window module as well to ensure that information (amount) of the wheel slip is enough to be compared with information (amount) of the longitudinal forces. A current wheel slip at a current sampling point and previous wheel slips at previous sampling points are output as a wheel slip matrix Λ simultaneously, and the wheel slip matrix Λ may be expressed as:

$$\Lambda = [\hat{\lambda}_k \ \hat{\lambda}_{k-1} \ \hat{\lambda}_{k-2} \ \ldots \ \hat{\mu}_{k-n+1}] \quad (27)$$

The minimum wheel slip and the maximum wheel slip in the wheel slip matrix Λ are found out to determine the (corresponding) maximum longitudinal force in the longitudinal force matrix M. The relationship may be expressed as:

$$\hat{F}_{b\_max} = \max(M) \quad (28)$$

$$[\hat{\lambda}_r, i_r] = \max(\Lambda) \quad (29)$$

$$[\hat{\lambda}_l, i_l] = \min(\Lambda) \quad (30)$$

Wherein $\hat{F}_{b\_max}$ is the maximum longitudinal force in the longitudinal force matrix M, $\hat{\lambda}_r$ and $\hat{\lambda}_l$ are the minimum wheel slip and the maximum wheel slip in the wheel slip matrix Λ respectively, $i_r$ and $i_l$ are indices corresponding to the minimum wheel slip and the maximum wheel slip. The longitudinal forces corresponding to the minimum wheel slip and the maximum wheel slip may be determined and may be expressed as:

$$\hat{F}_{b\_r} = M(i_r), \ \hat{F}_{b\_l} = M(i_l) \quad (31)$$

Wherein $\hat{F}_{b\_r}$ and $\hat{F}_{b\_l}$ are a right boundary longitudinal force and a left boundary longitudinal force respectively. When the maximum longitudinal force $\hat{F}_{b\_max}$ equals the right boundary longitudinal force $\hat{F}_{b\_r}$ (namely, $\hat{F}_{b\_max} = \hat{F}_{b\_r}$), the current longitudinal force of the wheel does not exceed a maximum $\hat{F}_{b\_p}$, and the relationship between the longitudinal force and the wheel slip lies within a stable region, which is presented by a thin dashed curve. If the maximum longitudinal force $\hat{F}_{b\_max}$ equals the left boundary longitudinal force $\hat{F}_{b\_l}$ (namely, $\hat{F}_{b\_max} = \hat{F}_{b\_l}$) i the current longitudinal force of the wheel is greater the maximum $\hat{F}_{b\_p}$, and the relationship between the longitudinal force and the wheel slip enter an unstable region, which is presented by a thin solid curve. If the maximum longitudinal force $F_{bmax}$ is not equal to either the right boundary longitudinal force $\hat{F}_{b\_r}$ or the left boundary longitudinal force $\hat{F}_{b\_l}$, the current longitudinal force of the wheel roughly approximate the maximum $\hat{F}_{b\_p}$. The relationship may be expressed as:

$$\text{state} = \begin{cases} \text{upd}, & \hat{F}_{b\_max} = \hat{F}_{b\_r} \\ \text{hld}, & \hat{F}_{b\_max} = \hat{F}_{b\_l} \\ \text{upd}, & \hat{F}_{b\_max} \neq \hat{F}_{b\_r} \ \& \ \hat{F}_{b\_max} \neq \hat{F}_{b\_l} \end{cases} \quad (32)$$

Wherein state is a current state of the estimator, upd is an update state, and hld is a hold state. $\hat{F}_{b\_p}$ would be revised corresponding to an output of the estimator. The relationship may be expressed as:

$$\hat{F}_{b\_peak,k} = \begin{cases} \hat{F}_{b\_ram}, & \text{upd} \\ \hat{F}_{b_p,k-1}, & \text{hld} \end{cases} \quad (33)$$

Wherein $\hat{F}_{b\_peak,k}$ is an estimated value of the maximum longitudinal force of the current road surface, and $\hat{F}_{b\_ram}$ is a temporary value of the maximum longitudinal force $\hat{F}_{b\_max}$. Whenever the estimator determines where the maximum longitudinal force $\hat{F}_{b\_max}$ falls, the maximum longitudinal force $\hat{F}_{b\_max}$ would be temporarily saved as the temporary value $\hat{F}_{b\_ram}$.

In other words, the maximum longitudinal force $\hat{F}_{b\_max}$ is compared with $\hat{F}_{bp,k-1}$. If the maximum longitudinal force $\hat{F}_{b\_max}$ exceeds $\hat{F}_{b_p,k-1}$ (namely, $\hat{F}_{b\_max} > \hat{F}_{b\_peak,k-1}$) it is indicated that the current braking force of the wheel is greater than the maximum braking force of the previous sampling point. In such a situation, a current position of the maximum longitudinal force $\hat{F}_{b\_max}$ is then to be found and determined. If the maximum longitudinal force $\hat{F}_{b\_max}$ falls on a right boundary, the state would be upd. If the maximum longitudinal force $\hat{F}_{b\_max}$ falls on a left boundary, the state would be hld. If the maximum longitudinal force $\hat{F}_{b\_max}$ fails to fall on either the right boundary or the left boundary, the state would be upd.

To summarize, a surface adaptation method of the present invention estimates longitudinal force(s) and vehicle speed(s) by means of conventional sensors, which are commonly set in a vehicle and may be a wheel speed sensor, a hydraulic pressure sensor and/or an accelerometer. A wheel slip threshold (aiming to serve as an optimized wheel slip) corresponding to a maximum longitudinal force is then determined after optimization of wheel slip(s) of a vehicle. A currently measured wheel slip, which is preferably lower than the wheel slip threshold, is accordingly optimized and under control by regulating a braking force. Therefore, efficiency for anti-lock braking would be increased. In addition, there is no need to configure extra sensors, which remarkably reduces the amount of sensors, and thus cost reduction is ensured without compromising quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A surface adaptation method, suitable for a vehicle, comprising:
    evaluating a plurality of longitudinal forces with respect to a plurality of sampling points;
    evaluating a plurality of wheel slips with respect to the plurality of sampling points, wherein each of the plurality of wheel slips is determined at least according to a wheel angular velocity at one of the plurality of sampling points, a plurality of angular velocity signals are averaged to calculate the wheel angular velocity at the sampling point, the plurality of angular velocity signals are successive and detected in a first time interval, each of the plurality of angular velocity signals is calculated by counting a number of turns in a second time interval, and a length of the first time interval is a multiple of a length of the second time interval;
    determining a maximum longitudinal force from the plurality of longitudinal forces;

determining a wheel slip threshold from the plurality of wheel slips, wherein the wheel slip threshold corresponds to the maximum longitudinal force; and optimizing a braking force for a specific surface, wherein the braking force is allowed to increase when a currently measured wheel slip is less than the wheel slip threshold, wherein the braking force is forbidden to increase when the currently measured wheel slip is greater than the wheel slip threshold.

2. The surface adaptation method of claim 1, wherein each of the plurality of wheel slips is determined according to an effective rotational radius, or a vehicle speed at a previous sampling point.

3. The surface adaptation method of claim 1, wherein a vehicle speed at one of the plurality of sampling points is determined according to a previous vehicle speed at a previous sampling point, a vehicle acceleration at the sampling point, an angular velocity estimator gain, a vehicle speed estimator gain, the wheel angular velocity at the sampling point, or an effective rotational radius, wherein the vehicle speed estimator gain is associated with one of the plurality of wheel slips.

4. The surface adaptation method of claim 1, wherein a vehicle speed at one of the plurality of sampling points is determined according to a previous vehicle speed at a previous sampling point, a vehicle acceleration at the sampling point, an angular velocity estimator gain of a first wheel, a vehicle speed estimator gain of the first wheel, a first wheel angular velocity of the first wheel at the sampling point, an effective rotational radius of the first wheel, an angular velocity estimator gain of a second wheel, a vehicle speed estimator gain of the second wheel, a second wheel angular velocity of the second wheel at the sampling point, or an effective rotational radius of the second wheel, wherein the angular velocity estimator gain of the first wheel or the angular velocity estimator gain of the second wheel is associated with one of the plurality of wheel slips.

5. The surface adaptation method of claim 1, wherein an effective rotational radius is evaluated according to a Kalman filter.

6. The surface adaptation method of claim 1, wherein an acceleration measurement bias is evaluated according to a Kalman filter.

7. The surface adaptation method of claim 1, wherein the plurality of longitudinal forces are evaluated according to a Kalman filter, wherein one of the plurality of longitudinal forces is associated with a brake secondary cylinder hydraulic pressure, a disk radius, a brake secondary cylinder piston area, or a piston disc friction coefficient.

8. A surface adaptation device, configured for a vehicle, comprising:
a storage device, for storing instructions of:
evaluating a plurality of longitudinal forces with respect to a plurality of sampling points;
evaluating a plurality of wheel slips with respect to the plurality of sampling points, wherein each of the plurality of wheel slips is determined at least according to a wheel angular velocity at one of the plurality of sampling points, a plurality of angular velocity signals are averaged to calculate the wheel angular velocity at the sampling point, the plurality of angular velocity signals are successive and detected in a first time interval, each of the plurality of angular velocity signals is calculated by counting a number of turns in a second time interval, and a length of the first time interval is a multiple of a length of the second time interval;

determining a maximum longitudinal force from the plurality of longitudinal forces;

determining a wheel slip threshold from the plurality of wheel slips, wherein the wheel slip threshold corresponds to the maximum longitudinal force; and optimizing a braking force for a specific surface, wherein the braking force is allowed to increase when a currently measured wheel slip is less than the wheel slip threshold, wherein the braking force is forbidden to increase when the currently measured wheel slip is greater than the wheel slip threshold; and a processing circuit, coupled to the storage device, configured to execute the instructions stored in the storage device.

9. The surface adaptation device of claim 8, wherein each of the plurality of wheel slips is determined according to an effective rotational radius, or a vehicle speed at a previous sampling point.

10. The surface adaptation device of claim 8, wherein a vehicle speed at one of the plurality of sampling points is determined according to a previous vehicle speed at a previous sampling point, a vehicle acceleration at the sampling point, an angular velocity estimator gain, a vehicle speed estimator gain, the wheel angular velocity at the sampling point, or an effective rotational radius, wherein the vehicle speed estimator gain is associated with one of the plurality of wheel slips.

11. The surface adaptation device of claim 8, wherein a vehicle speed at one of the plurality of sampling points is determined according to a previous vehicle speed at a previous sampling point, a vehicle acceleration at the sampling point, an angular velocity estimator gain of a first wheel, a vehicle speed estimator gain of the first wheel, a first wheel angular velocity of the first wheel at the sampling point, an effective rotational radius of the first wheel, an angular velocity estimator gain of a second wheel, a vehicle speed estimator gain of the second wheel, a second wheel angular velocity of the second wheel at the sampling point, or an effective rotational radius of the second wheel, wherein the angular velocity estimator gain of the first wheel or the angular velocity estimator gain of the second wheel is associated with one of the plurality of wheel slips.

12. The surface adaptation device of claim 8, wherein an effective rotational radius is evaluated according to a Kalman filter.

13. The surface adaptation device of claim 8, wherein an acceleration measurement bias is evaluated according to a Kalman filter.

14. The surface adaptation device of claim 8, wherein the plurality of longitudinal forces are evaluated according to a Kalman filter, wherein one of the plurality of longitudinal forces is associated with a brake secondary cylinder hydraulic pressure, a disk radius, a brake secondary cylinder piston area, or a piston disc friction coefficient.

* * * * *